Nov. 21, 1944.    J. W. CADE    2,363,228

CABLE TENSION REGULATOR

Filed Feb. 7, 1944

INVENTOR
JOHN W. CADE
BY J. A. Bried
ATTORNEY

Patented Nov. 21, 1944

2,363,228

UNITED STATES PATENT OFFICE 2,363,228

CABLE TENSION REGULATOR

John W. Cade, La Canada, Calif., assignor to Sturgess, Inc., Glendale, Calif., a corporation of California Application February 7, 1944, Serial No. 521,389

14 Claims. (Cl. 74—501)

This invention relates to devices for regulating the tension in cables, particularly the control cables of air craft.

The principal object of the invention is to provide a simple, dependable tension controlling device for the above purpose. Special features and advantages of the invention will appear in the following description and accompanying drawing.

Figure 1:
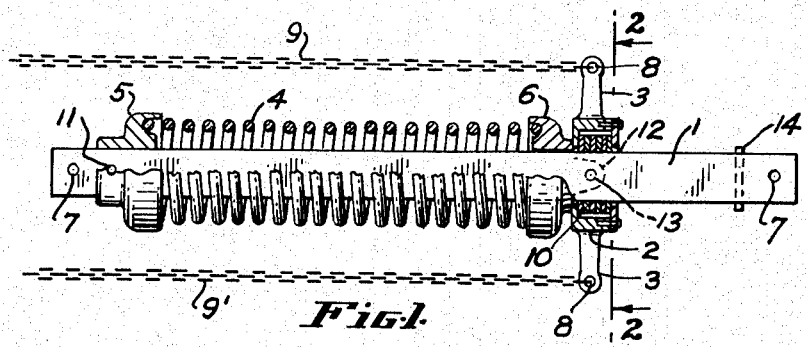
Fig. 1 is a plan view partly in longitudinal cross section, showing one construction embodying my invention.

In control cables for aircraft generally it is required that some device insure that all slack be taken up and a minimum working tension be substantially maintained in the cables at all times when the controlled elements are in neutral or intermediate position (notwithstanding the fact that the cables stretch with use and the distance between the operating ends of the control cables and the movable part operated or controlled by the remote ends of the cables varies constantly with temperature changes), but upon a pull or increased tension being applied to either one of a pair of cooperating control cables, the minimum tension maintaining device will at once become locked out or inert so that the control cables from that moment function as properly tensioned through cables, until the extra operating tension on the one is reduced to the same tension as the other cable of the pair and at which time the tensioning device is automatically unlocked and again functions to take up slack or relieve over strain, until such time as a pull on either cable repeats the above cycle.

My invention accomplishes the above purpose, and others in an extremely efficient, simple and compact device, and comprises essentially an elongated body or bar with a spring urged relatively slidable bearing member or block embracing the bar. Either member is adapted to be fixed or anchored, and the pair of control cables are respectively secured to the free member to pull against the spring to maintain the desired tension in both cables, but they are connected to the free member through the medium of a balancing or rocking lever so that any out of balance pull on the two cables will "cock" or cant the bearing member on the bar and at once grip its opposite sides and lock the two members together against any further sliding action until the balanced pull on the cables is restored.

The invention takes several detailed forms as shown in the drawing, tho all operate on the principle above set out and which I believe to be new in this art.

In all figures of the drawing the bar member is designated 1 and the relatively slidable member embracing the bar is designated 2, the rocking lever 3, the spring 4, fixed spring saddle at one end of the spring 5, floating spring saddle at opposite end of the spring 6, 7 are anchor holes, and 8 are holes in the opposite ends of the rocking lever to which the ends of the cables dotted at 9 and 9' are attached or connected.

In the design of Fig. 1 the bar 1 is preferably of metal, and is oblong in cross section and is the relatively fixed member to be secured to some part of the air craft. Slidable member 2 is a hub and preferably a free sliding fit on the rectangular bar 1 so that if it were canted on the bar its edges would impinge against the bar and effectively lock it against further sliding until it was again straightened up at right angles with the bar as shown. The hub may be of solid metal (as shown in Figs. 3 to 6) but in order to get an increased grip upon the bar the hub is preferably hollow and fitted interiorly with a plurality of loose plates or "washers" as shown at 10 as will be later more fully described.

Projecting outward from slidable member 2 are lever arms 3 provided at their outer ends with holes for attaching the ends, respectively, of a pair of cooperating control cables dotted at 9 and 9'. The arms 3 form a lever firmly secured to slidable hub 2 and extending transversely of the longitudinal axis of the bar so that any unequal pull on the cables will cant the hub 2 to locking position.

Slidable member 2 is normally urged to slide along the bar in a direction tending to maintain the cables under the required tension, and to take up any slack developed or yield to any relative shrinking of the cables or expansion of the fuselage or other structure upon which the device is mounted. This is accomplished by the coiled compression spring 4 which surrounds the bar 1 and reacts between the fixed saddle 5 which also surrounds the bar and is suitably secured thereto as by a pin 11 or any other means, and the floating saddle 6 which is preferably provided with a pair of ears 12 pivoted at 13 to opposite sides of the hub 2 on an axis extending at right angles to the plane of lever 2 all in a manner so that the hub may be rocked by unequal pull upon the cables without displacing the spring saddle 6. It is possible to dispense with the ears 12 and pivots 13 and simply permit the rounded wall of the floating saddle 6 to bear against the hub 2, but the pivotal connection at the center of the hub as described overcomes any tendency of the spring pressure tending to straighten the hub when once canted or cocked on the bar by unequal cable tension.

The spring is always under compression, and to limit its expansion a suitable stop should be provided, such as a pin 14 projecting from the bar.

Figure 2:
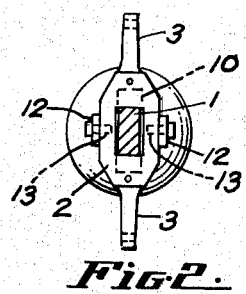
Fig. 2 is a cross section of Fig. 1 as seen from the line 2—2 thereof.
Figures 7, 8:
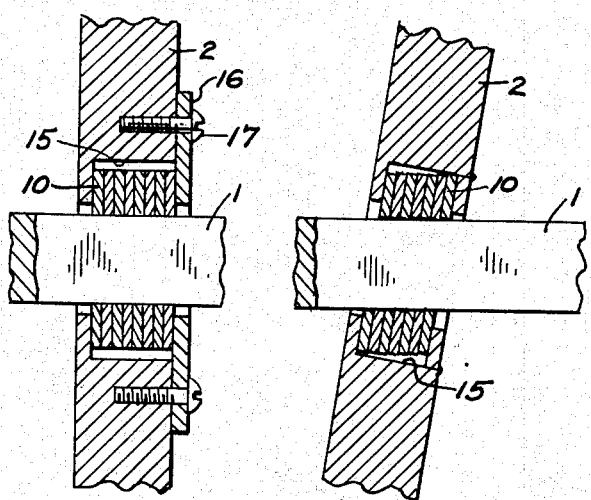
Fig. 7 is an enlarged sectional view showing the multiple friction plates in the hub of the member which rocks relatively to the body or bar member.
Fig. 8 shows the hub of Fig. 7 in exaggerated canted position.

Regarding the hub 2, it is evident from the construction set out for Figs. 1 and 2 the bar is gripped at its narrow edges only when the hub is canted by any unequal pull on the cables, and to get a better gripping effect the thin plates 10 may be used. Figs. 7 and 8 show the construction of this more clearly and from which it will be seen that the hub is recessed at opposite edges of the bar as at 15 and within the recesses are a number of thin plates 10. These plates may be of metal or of friction fiber. A non-rusting metal such as Monel metal has been found satisfactory. The plates are free enough in the recess to slide against one another when the hub 2 is canted to position shown in Fig. 8 and all bring their edges to bear with great pressure upon the bar to thus lock the hub from any further sliding on the bar until the hub is again righted. For convenience of insertion of the thin plates a removable cover plate 16 is provided at one side of the recess and held in place as by screws 17 or it may be welded.

While the drawing shows the bar 1 of Figs. 1 and 2 as rectangular, and which is a simple way to maintain the plane of the arms 2 and cables in correct position, still the bar may be round, as shown for the other figures to be described.

Figure 3:
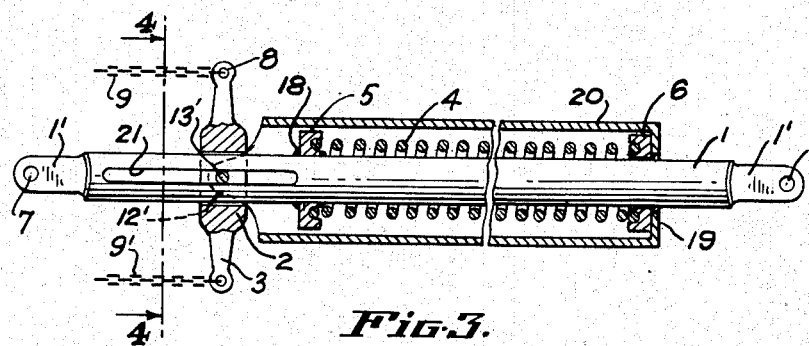
Fig. 3 is a plan view, partly in longitudinal cross section showing a modification of the invention as expressed in Fig. 1.
Figure 4:
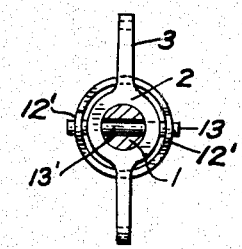
Fig. 4 is a cross section of Fig. 3 as seen from the line 4—4 thereof.

In the construction of Figs. 3 and 4 the operation is the same for the similarly enumerated parts described for Figs. 1 and 2, and the only difference is that the bar 1 is round and may be either solid or a piece of pipe and has a pair of flattened ends 1' either formed on or welded thereto and which are provided with the anchor holes 7.

In this figure the fixed spring saddle 5 is shown secured to the bar as by welding at 18, and the floating spring saddle 6 is positioned within the end wall 19 of a tube 20 which forms an extension of the floating saddle and a covering for the spring, the extreme end of the tube 20 being formed with ears 12' pivoted to the hub 2 as at 13' as described for Fig. 1 except that in Fig. 3 the pivot pin 13' passes entirely through a slot 21 formed in the bar so as to maintain the plane of the lever arms 3 and cables in the desired plane. The slot 21 also functions as a two-way limit stop for the maximum desired sliding motion of the hub 2. While in this design the hub 2 is shown solid, it is manifest that it may be internally fitted with plates 10 as shown in Figs. 1, 2, 7 and 8.

Figure 5:
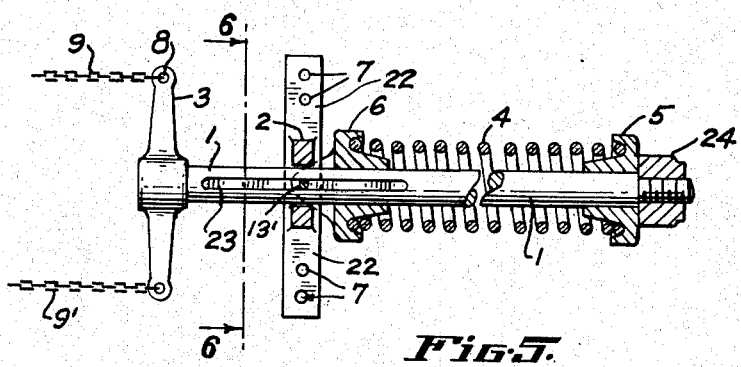
Fig. 5 is a plan view partly in longitudinal cross section showing another modification of the invention.
Figure 6:
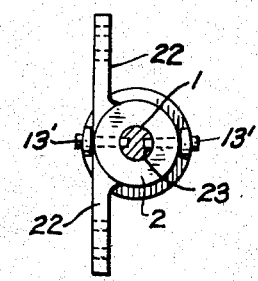
Fig. 6 is a cross section of Fig. 5 as seen from the line 6—6 thereof.

In the construction shown in Figs. 5 and 6 the canting relation of bar and hub is reversed from that of Figs. 1 and 3 in that here it is the bar which is provided with the cable attaching lever, and the hub member 2 is anchored, so that it is the bar which is forcibly canted in the fixed hub to lock the relatively slidable parts.

In this construction the hub block 2 is provided with suitable base lugs 22 for anchoring it by bolts passing through holes 7, and the floating spring saddle 6 is provided with ears 12 pivoted to the sides of the hub block 2 as described for Figs. 1 and 2 except that here one of the pivot pins 13' passes through the side of the hub and into a keyway 23 formed along one side of the bar 1 to prevent the parts from turning, if this is desired, and also to form a limit stop for sliding travel.

The other spring saddle 5 is at the extreme end of the bar 1 and held from coming off by a lock nut 24 or any other suitable means.

At the opposite end of the bar the tilting or canting lever or cable attaching arms 3 are rigidly secured as by pins, welding, or any other desired means. The hub may of course also be fitted with thin loose plates as described for Figs. 1 and 2.

Figure 9:
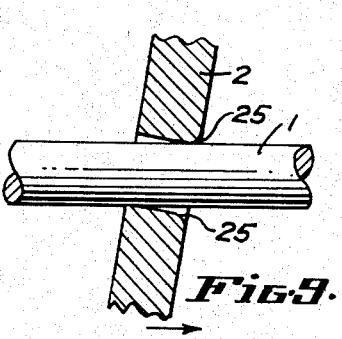
Fig. 9 shows a one-way locking hub when canted.

While it will be plain from a consideration of the drawing that upon tilting the hub or block 2 relative to the bar 1 the parts are at once locked against sliding in either direction, yet in some cases it may be desired to always permit sliding of the hub in direction urged by the tensioning spring 4 but not in the opposite direction. In such cases it suffices to round off the edges of the hole in the hub at one side only as indicated at 25 in exaggerated form in Fig. 9, and wherein the parts may be forcibly slid in direction of the arrows but are rigidly locked against opposite direction of movement.

In Figs. 7 and 8 the thin friction plates are shown applied to a flat bar as of Figs. 1 and 2, but it is manifest that they will equally apply to a round bar or shaft and will then be simple round washers surrounding the bar, and would appear the same as shown in these figures.

The word "bar" or "bar member" as used herein and in the claims is intended to mean any elongated member along which the hub member or its equivalent moves along under tension of the spring and cable pull.

The word "cable" or "cables" as used herein and in the claims are intended to include any other tension members which may be interposed in the lengths of cables, such as ropes, chains, wires, rods, etc.

In use of the cable tension controller on aircraft and other purposes it may be applied to the cables in a number of different ways as shown in prior patents and literature on the subject as well understood in the art.

Having thus described my invention and some of its possible variations it will be evident that other modifications may be made within the spirit of the invention and scope of my appended claims.

I therefore claim:

1. In a cable tension regulator of the character described, an elongated guide member, a block member slidable along said guide member, and said block member being of a length adapted when canted relative to the guide member to bind on the guide member and thus become locked against sliding movement until uncanted, means for connecting a pair of cables to one of the members respectively at points laterally spaced from the center of said guide member so that an unequal pull on said cables will cant said members relatively for locking them against relative sliding movement.

2. In a cable tension regulator of the character described, an elongated guide member, a block member slidable along said guide member, and said block member being of a length adapted when canted relative to the guide member to bind on the guide member and thus become locked against sliding movement until uncanted, means for connecting a pair of cables to one of the members respectively at points laterally spaced from the center of said guide member so that an unequal pull on said cables will cant said member relatively for locking them against relative sliding movement, means for anchoring the other of said members, and means resiliently urging the member to which the cables are connected in direction for tensioning the cables.

3. In a cable tension regulator of the character described, an elongated guide member, a block members slidable along said guide member, and said block member being of a length adapted when canted relative to the guide member to bind on the guide member and thus become locked against sliding movement until uncanted, a coiled spring arranged to resiliently urge the block member along the guide member, and means pivotally fulcruming the spring against the block member.

4. In a cable tension regulator of the character described, an elongated guide member, a block member slidable along said guide member, and said block member being of a length adapted when canted relative to the guide member to bind on the guide member and thus become locked against sliding movement until uncanted, a coiled spring arranged to resiliently urge the block member along the guide member, and means pivotally fulcruming the spring against the block member substantially at the central axis of the block member to facilitate its canting action.

5. In a cable tension regulator of the character described, an elongated guide member, a block member slidable along said guide member, and said block member being of a length adapted when canted relative to the guide member to bind on the guide member and thus become locked against sliding movement until uncanted, a coiled spring arranged to resiliently urge the block member along the guide member, and means pivotally fulcruming the spring against the block member substantially at the central axis of the block member to facilitate its canting action, and means extending from opposite sides of the block member adapted for respectively connecting a pair of cables.

6. In the construction as set out in claim 2, a plurality of plates positioned within said block member in edgewise contact with said guide member.

7. In the construction set out in claim 2, a plurality of plates positioned within said block member in edgewise contact with said guide member and said plates being free enough to slide against one another to be forced against the guide edgewise as the block is canted relative to the guide member.

8. In a structure as set out in claim 2, said block member being rounded at one end only where it normally contacts the guide member so that it will lock against slidable movement in one direction only when canted.

9. In a structure as set out in claim 2, said elongated guide member being a flat sided bar, and said block member being a hub slidably embracing said bar.

10. In a structure as set out in claim 2, said elongated guide member being a cylindrical bar-like member, and said block member being a hub slidably embracing said bar-like member and provided with a pin engaging a longitudinal groove formed in said bar-like member.

11. In a structure as set out in claim 2, said elongated guide member being a cylindrical bar-like member, and said block member being a hub slidably embracing said bar-like member and provided with a pin passing through a slot formed in said bar-like member.

12. In the construction set out in claim 3, said last mentioned means being a tube covering the coiled spring and pivoted at one end to the block member.

13. A cable tension regulator comprising an elongated bar member and a hub member slidably embracing said bar member, means for anchoring one of said members, a coiled spring arranged to urge said hub member to slide relatively to said bar member longitudinally thereof, and lever means extending from opposite sides of the other member adapted for connecting to a pair of cables to be tensioned by said spring and whereby an unequal pull on the ends of the lever means will cant said other member and lock it against sliding movement until said other member is uncanted.

14. A cable tension regulator comprising an elongated member and a block member slidably engaging said elongated member for relative movement therealong, said block member formed in a manner for locking in its sliding engagement upon the members being relatively canted, means for anchoring one of said members, lever means on the other member adapted for connection to cables to be tensioned and for canting said other member upon unequal pull on said cables, and resilient means urging said other member to slide in direction for tensioning said cables.

JOHN W. CADE.